United States Patent

[11] 3,589,478

| [72] | Inventors | C. Lucas Plaat<br>Troy;<br>Richard E. Frazier, Pleasant Hill, both of, Ohio |
|------|-----------|---|
| [21] | Appl. No. | 853,408 |
| [22] | Filed | Aug. 27, 1969 |
| [45] | Patented | June 29, 1971 |
| [73] | Assignee | The B.F. Goodrich Company<br>New York, N.Y. |

[54] BRAKE RETRACTOR MECHANISM
10 Claims, 3 Drawing Figs.

[52] U.S. Cl. .................................... 188/196,
188/71.8
[51] Int. Cl. ..................................... F16d 65/54,
F16d 55/18
[50] Field of Search ........................... 188/71.8,
72.3, 196 P

[56] References Cited
UNITED STATES PATENTS

| 2,888,104 | 5/1959 | Frayer | 188/71.8 |
| 2,951,560 | 9/1960 | Smellie | 188/71.8 |
| 3,091,310 | 5/1963 | Smith et al. | 188/196 |

*Primary Examiner*—Duane A. Reger
*Attorneys*—John D. Haney and Harold S. Meyer

ABSTRACT: A brake retractor assembly in which a pair of hinged clamping levers grip the retractor rod on opposite sides as a result of pressure exerted against the ends of the levers by the retractor spring. The clamping pressure against the rod is released after the rod is moved beyond the normal brake release clearance distance by actuation of the other ends of the levers whereby the spring force is overcome by the brake actuating force.

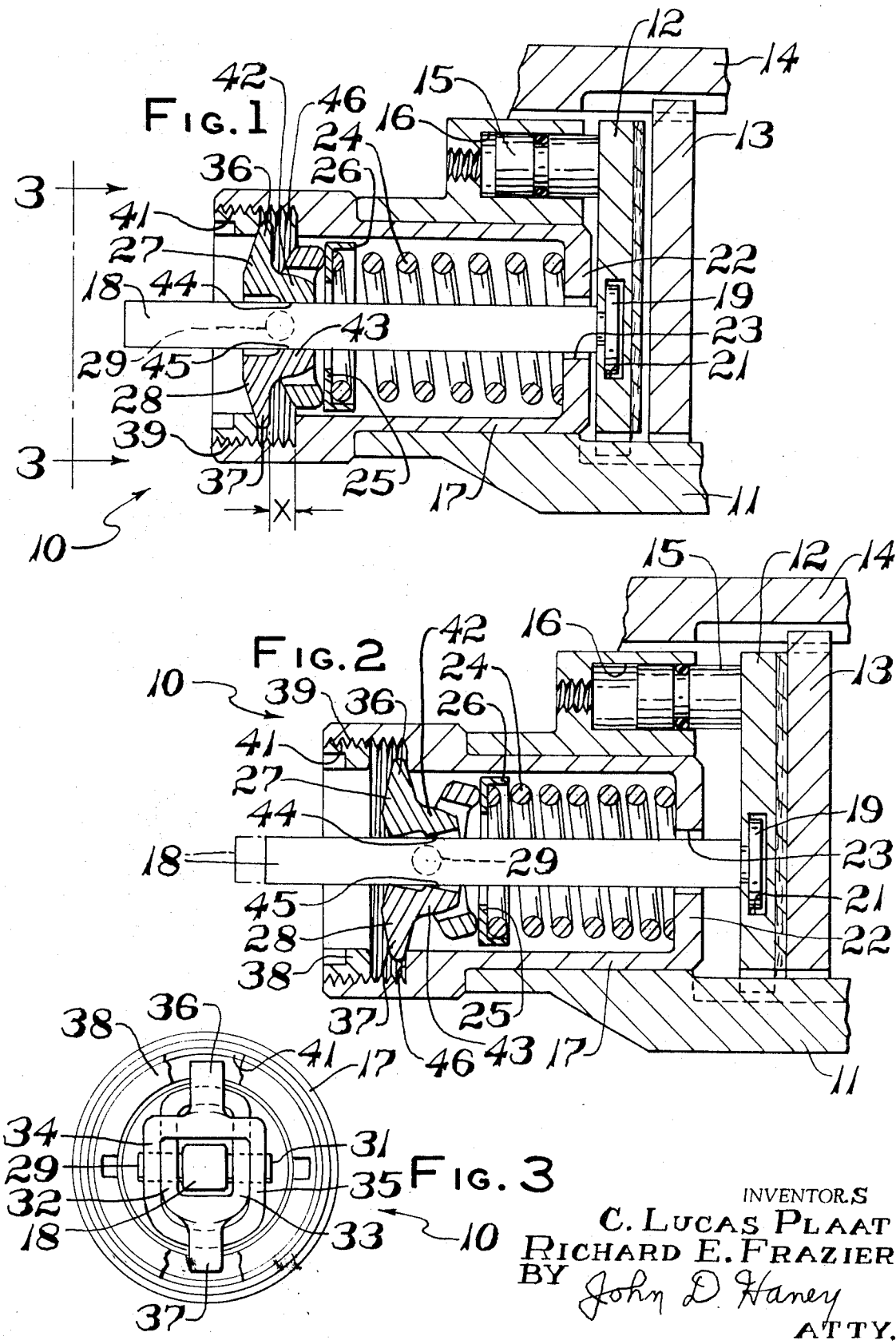

BRAKE RETRACTOR MECHANISM

BACKGROUND OF THE INVENTION

This invention relates to mechanism for automatically maintaining a uniform release clearance (and therefore a uniform actuating stroke) for brakes and similar equipment. Mechanisms of this type are commonly used in brake systems to compensate for wear of the brake linings and other brake parts and are popularly called "automatic brake adjusters". Although the present invention is explained here in connection with brakes, the mechanism has utility in other environments where similar wear compensation is needed such as in clutches.

For many years, brake adjusters or wear compensators have been of two basic designs. The mechanical adjusters utilized special ratchets or friction-dragging parts to control the adjustment and the hydraulic adjusters utilized the metering of hydraulic fluid to provide adjustment. A sophisticated form of hydraulic adjuster is described, for example, in U.S. Pat. No. 2,926,498 and a mechanical ratchet adjuster is described, for example, in U.S. Pat. No. 1,825,555. An improved form of mechanical adjuster in which the step-by-step adjustments of the ratchet-type adjuster are avoided and the adjustments can be made in small increments is shown and described in U.S. Pat. No. 2,392,970 and U.S. Pat. No. 3,091,310 in which gripping of the retractor rod is provided through the use of collets or locking plates.

One of the problems with brake adjusters of the mechanical-type is that the gripping forces on the retractor rod are applied in such a way that a bending moment is applied to the rod which causes it to wear excessively and bind in the area where the rod slides against other brake parts. This problem is especially prevalent in constructions where locking plates or other single lever-type gripping members are used.

The force necessary to return the retractor rod to a retracted position in the released condition of the brake heretofore has been relatively small and therefore the retractor springs have only had to be large enough to overcome the friction between the brake parts to which they were connected and move the hydraulic pistons to the released position. In modern high energy brakes the actuating pressure in the hydraulic system has been increased and this has resulted in appreciable hydraulic back pressures in the actuating brake cylinder after release of the brake which must be overcome by the brake retractors. This requires the gripping forces exerted on the retractor rod to be greater to move the rod to the retracted position. At the same time the adjusting mechanism must be effective to compensate for brake lining wear. All of this must be done with a mechanism which is compact and of a size which will fit in the limited space envelope specified for brakes of this type. It is also essential that a brake adjuster of this type be relatively service-free, provide consistent operation, ease of assembly and simplicity of installation.

SUMMARY OF THE INVENTION

The retractor assembly of this invention includes a heavy duty clamping mechanism in which a substantial clamping force is exerted against the retractor rod to prevent slippage when the pressure of the hydraulic fluid in the actuating piston exerts a relatively high back pressure against the rod and a heavier retractor spring is required. In addition, the clamping mechanism has hinged clamping levers which straddle the retractor rod and exert clamping force on both sides of the retractor rod. This balanced force on the retractor rod eliminates binding and excessive wear of the rod as it slides in the brake structure.

The retractor rod is carried by a housing mounted on a brake torque frame which contains a helical retractor spring and the clamping mechanism. The retractor spring is preloaded with one end bearing against a flange of the housing and the other end bearing against a spring-retaining washer within the housing. The retractor rod extends through the retaining washer, retractor spring and the housing flange.

The clamping mechanism has two clamping levers which straddle the retractor rod and are hinged together at opposite sides of the rod. Each of these clamping levers has a clamping face which is urged against the retractor rod by the force of the preloaded retractor spring bearing against the spring retaining washer which is in engagement with one end of each clamping lever.

The other end of each clamping lever extends outwardly of the clamping mechanism and has an ear which engages an annular stop member on ring threaded in the cylindrical opening of the housing. In the released condition of the brake, the retractor spring biases the ears of the clamping levers against the stop member.

As the brake is actuated the retractor rod moves the clamping mechanism and spring retaining washer away from the stop member causing further compression of the retractor spring. This results in an increased force against the ends of the clamping levers and an increased frictional engagement of the clamping surfaces against the retractor rod reducing the possibility of slippage. The rod has flat surfaces against which the flat clamping surfaces of the clamping levers press to further provide the high clamping forces necessary to resist slippage during actuation of the brake.

After the retractor rod has moved a predetermined distance, the ears of the clamping levers will engage a shoulder of the housing producing a moment about the axis of the hinged connection between the clamping levers which is greater than the moment in the opposite direction urging the clamping surfaces against the retractor rod. This reduction in the clamping force on the retractor rod will permit slippage of the retractor rod through the clamping mechanism to compensate for wear of the brake linings or other brake parts. As the clamping levers reduce the clamping force on the retractor rod, they push the clamping mechanism away from the housing shoulder and the retractor spring force again activates the clamping action on the retractor rod.

Upon release of the brake the retractor spring urges the clamping mechanism back into engagement with the stop member and the brake displacement or brake release clearance will be maintained by a constant amount. The brake clearance can be set by screwing the stop member into or out of the housing thereby changing the distance between the stop member and the housing shoulder.

During repeated cycles of actuating and releasing the brake the retractor rod will be moved through the clamping mechanism and housing in increments until it is time to replace the brake lining. The need for replacing the brake lining is indicated by the exposed end of the retractor rod opposite to that end of the retractor rod opposite to that end which is in engagement with the brake members. Service personnel can actuate the clamping mechanism through the open end of the housing to release the clamping pressure on the retractor rod and move it to the original new lining position without having to disassemble the retractor assembly.

The accompanying drawings show one preferred form of brake retractor made in accordance with and embodying this invention and which is representative of how this invention may be practiced.

BRIEF DESCRIPTION OF THE DRAWINGS

In the drawings:

FIG. 1 is a longitudinal cross section of the retractor assembly installed in a typical disc brake, the assembly being in the condition its parts occupy when the brake is retracted or released, the brake parts being shown in generalized or somewhat schematic form with some parts being broken away;

FIG. 2 is a view corresponding to FIG. 1 except that the brake is engaged and the retractor assembly is in the condition its parts occupy during an adjusting movement of the adjusting mechanism to compensate for wear of the brake friction faces; and, FIG. 3 is a view on the line 3-3 of FIG. 1 with some parts being broken away.

DETAILED DESCRIPTION

A retractor assembly 10 is mounted rigidly in a torque frame 11 of a brake, the frame in turn being adapted for mounting to a vehicle structure (not shown). The frame 11 carries a lining carrier 12 in parallel axial alignment with a rotatable disc 13. The latter is in splined engagement at its periphery with a rotary member 14 which may be part of the wheel structure with which the brake is associated. On the other side of the rotatable disc 13 in the area which is broken away another lining carrier and retractor assembly like that shown may be mounted on the torque frame 11.

The brake is actuated and the brake members engaged by a hydraulic piston 15 mounted in a cylinder 16 in the brake frame 11. In response to hydraulic pressure the hydraulic piston 15 urges the lining carrier 12 against the brake disc 13 which resists axial movement by engaging other brake members not shown. The brake members as shown in FIG. 1 are in the released condition with the lining carrier 12 and the rotatable disc 13 out of engagement. In FIG. 2 the retractor assembly is shown in the actuated condition with the brake members in engagement.

The brake retractor assembly 10 includes a cylindrical housing 17 which may be part of the brake frame 11 or adapted for tight anchorage inside the brake frame as shown in FIG. 1.

A retractor rod 18 extends through the housing 17 and towards the braking members where it is connected to the lining carrier 12 as by insertion of an enlarged head 19 of the retractor rod in a slot 21 of the lining carrier 12 as shown in FIG. 1 or by other arrangements well known in the art.

The cylindrical housing 17 has a flange 22 at the end adjacent the braking members which may be in slidable engagement with the retractor rod 18. Since the retractor rod 18 has a substantially square cross section as shown in FIG. 3 the opening 23 in the housing flange 22 may also have a square configuration.

A helical retractor spring 24 is interposed between the cylindrical housing 17 and the retractor rod 18. At the right end of the housing 17 (as viewed in FIG. 1) the retractor spring 24 engages the housing flange 22. The other end of the retractor spring 24 engages the face of a spring-retaining member such as washer 25 which has an annular collar 26 at the outer periphery for slidable engagement with the wall of the housing 17 and to retain the end coil of the retractor spring 24.

A clamping lever 27 engages the other face of the washer 25 and is hinged to a connecting member which in this embodiment is a second clamping lever 28. The clamping lever 27 and the second clamping lever 28 are hinged together as by a pin 29 connecting the levers at one side of the retractor rod and another pin 31 coaxial with the first-mentioned pin 29 and located at the opposite side of the retractor rod. The axis of the pins 29 and 31 is preferably in a plane perpendicular to the axis of the retractor rod 18. The second clamping lever 28 has one end engaging the washer 25 at a position diametrically opposite the position where the end of the other clamping lever 27 engages the washer. As shown in FIGS. 1 and 3, the second clamping lever 28 has arms 32 and 33 which straddle the retractor rod 18 and the clamping lever 27 has arms 34 and 35 which straddle the arms 32 and 33 of the other clamping lever as well as the retractor rod 18. At the ends of the clamping levers 27 and 28 opposite to the ends which engage the spring-retaining washer 25 are radially extending ears 36 and 37 respectfully. In the released condition of the brake these ears engage a stop member such as ring 38 which has threads 39 at the outer periphery in engagement with matching threads 41 in the inner periphery of the open end of the housing 17. This part of the housing has a greater diameter than the portion which contains the retractor spring 24.

Between the ears 36 and 37 and the pins 29 and 31 are clamping lever extensions 42 and 43 having clamping surfaces 44 and 45 for engagement with the retractor rod 18. These surfaces 44 and 45 are relatively flat; however, they have offset portions to permit rocking of the clamping levers 27 and 28 about the pivot pins 29 and 31.

In the released condition of the brake the ears 36 and 37 of the clamping levers 27 and 28 under the bias of retractor spring 24 acting on washer 25 are pressed against the ring 38. In this condition the retractor spring 24 is under compression as it is assembled in a preloaded condition. Accordingly, the action of the retractor spring 24 on one side and the ring 38 on the other side against the ends of the clamping levers 27 and 28 causes a moment around the axis of the pins 29 and 31 which presses the clamping surfaces 44 and 45 against the retractor rod 18. The resultant frictional engagement holds the retractor rod 18 against any slippage. In addition the surfaces 44 and 45 which engage the retractor rod 18 do so at diametrically opposite positions on each side of the rod. This results in balancing of the forces on the retractor rod and avoids imposing a bending moment or other force which would cause binding or excessive wear of the rod against the housing flange 22 or other braking members.

When the brake is operated by communicating hydraulic fluid to piston 15 the latter displaces the lining carrier 12 rightward (as shown in FIG. 1) pulling the retractor rod 18 axially through the flange 22 of housing 17. The clamping levers 27 and 28 are moved rightward as the retractor rod advances because of the clamping action at the clamping surfaces 44 and 45 caused by the retractor spring 24 acting on the washer 25 and against the ends of the clamping levers which are in engagement with the washer. The resulting moment about the axis of pins 29 and 31 provides sufficient clamping force to prevent slippage of the retractor rod. In fact, as the retractor rod 18 moves rightward the clamping force increases due to the increased compression of the retractor spring 24.

Should there be no appreciable wear or other condition materially changing the release clearance between the braking members while these members are engaged, then rod 18 will remain in the gripped condition relative to the clamping levers 27 and 28. When the brake actuation pressure is released the retractor spring 24 will expand to return the rod 18 to its original starting position. The mechanism is designed so that the distance designated by dimension "X" in FIG. 1 which is the distance between the ears 36 and 37 of the clamping levers 27 and 28 and a shoulder 46 of the housing 17 is equal to the maximum allowable release clearance between the braking members. As long as the release clearance does not exceed an amount indicated by dimension "X" the clamping action of the clamping levers 27 and 28 on the retractor rod 18 will continue and there will be tight frictional engagement with the retractor rod. This condition will continue even though the brake members may be engaged and released repeatedly.

In accordance with the present brake design practice, it is normal to have erosion of the brake members and the brake linings as the brake is operated and therefore the release clearance between the lining carrier 12, brake disc 13 and the other brake members tends to increase progressively. The existence of this condition is automatically sensed in this mechanism because retractor rod 18 and lining carrier 12 can be displaced for whatever distance necessary to bring about brake engagement regardless of wear. Accordingly, whenever the lining carrier 12 and rod 18 are moved through a distance greater than that equal to dimension "X" in order to engage the brake members, the ears 36 and 37 of clamping levers 27 and 28 will be forced into engagement with the housing shoulder 46. This engagement produces a moment about the axis of the pins 29 and 31 which is greater than the moment in the opposite direction urging the clamping surfaces against the retractor rod. There is, therefore, a reduction in the clamping force on the retractor rod 18 which results in slippage of the retractor rod through the clamping surfaces 44 and 45 to compensate for the wear of the brake linings or other brake parts. As the clamping levers 27 and 28 reduce the clamping force on the retractor rod 18 they push the levers away from the housing shoulder 46 and the retractor spring 24 again produces a clamping moment about the pins 29 and 31 providing substantial frictional engagement with the retractor rod.

On the subsequent release of fluid pressure against the piston 15, the biasing force of retractor spring 24 against the washer and clamping levers 27 and 28 will return the rod 18 to the released position with the ears 36 and 37 in engagement with the stop member or ring 38. Since the retraction stroke is limited by the distance the ears 36 and 37 can move before they abut the ring 38, the rod 18 is retracted only a distance equivalent to dimension "X" and therefore a new starting position is established for the rod and the lining carrier 12 whereby the release clearance between the lining carrier and the other brake members is again equal to dimension "X.".

The progressive relocation of the starting position of the rod 18 and the lining carrier 12 in this manner does not change the maximum deflection amplitude of the retractor spring 24. The retractor spring deflection amplitude remains substantially the same on every actuation from the time the brake is new until the lining is entirely worn out.

As the starting position of the retractor rod 18 is progressively relocated and the effective length of the rod is increased the end of the rod which is not in engagement with the lining carrier 12 and which extends outward from the housing 17 will move rightward as shown in FIG. 1. This can be used as an indicator of brake and lining wear and by marking the retractor rod at a particular position relative to the housing it will indicate when replacement of the lining is necessary.

To replace the worn lining carrier the position of the rod 18 may be reset by inserting a tool inside the ring 38 and behind the ears 36 and 37 to produce a turning moment about the axis of pins 31 and 29 which will release the clamping pressure on the retractor rod. This can be done with a simple tool which will exert pressure between the ear of one clamping lever and the end of the other clamping lever. When this clamping pressure is released the retractor rod may be moved back to its original position. The lining carrier 12 may, therefore, be removed by turning it in a circumferential direction so that the enlarged head of the retractor rod 19 may be removed from the slot 21 in the lining carrier. This can be done without removing the retractor assembly. A new lining carrier 12 may then be inserted in the brake and slid into engagement with the rod 18.

In the event it is desired to change the brake release clearance indicated by "X" in FIG. 1 during installation or servicing of the brake, this may be done by turning ring 38 in the housing 17 to move the ring axially of the housing through the means of the screw threads 39 and 41 in the ring and housing. Removal of the ring 38 also permits disassembly of the retractor assembly 10 except for the retractor rod which cannot be removed until the lining carrier 12 is moved circumferentially so that the enlarged head 19 of the retractor rod can be removed from slot 21.

Depending on the size of the brake, one or a number of these retractor assemblies may then be used in axially spaced position in the torque frame.

We claim:

1. A brake retractor assembly comprising a housing secured in a brake torque frame, a rod connected to a braking member and mounted in said housing for relative axial movement, a retractor spring interposed between said rod and said housing and being compressed between an anchorage on said housing and a spring-retaining member, a clamping lever with one end in engagement with said spring-retaining member, a connecting member carried by said rod and having a hinged connection with said clamping lever for pivotal movement of said lever, a clamping surface on said clamping lever for frictional engagement with said rod upon pivotal movement of said lever by action of said spring-retaining member against said one end of said clamping lever, the other end of said clamping lever being disposed for engagement with said housing after movement of said rod through a predetermined distance during actuation of the brake to move said clamping surface out of frictional engagement with said rod and permit movement of said rod relative to said clamping surface whereby adjustments for changes and wear are made to maintain a uniform release clearance between the braking members.

2. A brake retractor assembly according to claim 1 wherein said connecting member is a second clamping lever with one end in engagement with said spring-retaining member at a position diametrically opposite to the position where the other clamping lever engages said spring-retaining member.

3. A brake retractor assembly according to claim 2 wherein said second clamping lever has a clamping surface for frictional engagement with said rod upon pivotal movement of said lever at a position diametrically opposite to the position where the other clamping surface engages said rod.

4. A brake retractor assembly according to claim 3 wherein flat parallel faces on opposite sides of said rod are provided for engagement by the clamping surfaces of the clamping levers.

5. A brake retractor assembly according to claim 4 wherein the ends of the clamping levers are in engagement with both the housing and spring-retaining member in the released condition of the brake.

6. A brake retractor assembly according to claim 5 in which said retractor spring is preloaded in the released condition of the brake.

7. A brake retractor assembly according to claim 6 in which the part of said housing engaged by the ends of the clamping levers is a stop member removably mounted in said housing and axially adjustable for changing the predetermined distance said rod is moved before the ends of the clamping levers engage the housing after actuation of the brake.

8. A brake retractor assembly according to claim 2 wherein said clamping levers have apertures through which said rod passes.

9. A brake retractor assembly according to claim 8 wherein said hinged connection comprises coaxial pivot pins connecting the clamping levers on opposite sides of said rod.

10. A brake retractor assembly according to claim 9 wherein said housing has an open end for inserting said retractor spring and the clamping levers, and said stop member has an opening through which access may be had to the clamping levers so that they may be biased to release the pressure of the clamping surfaces on said rod and thereby permit movement of the rod to the original released position for installing a new lining carrier.